Aug. 28, 1951 W. H. BLISS 2,566,078
TIME MEASURING AND RECORDING DEVICE
Filed March 27, 1947 4 Sheets-Sheet 1

INVENTOR.
Warren H. Bliss
BY
C.D. Tuska
ATTORNEY

Aug. 28, 1951     W. H. BLISS     2,566,078
TIME MEASURING AND RECORDING DEVICE
Filed March 27, 1947     4 Sheets-Sheet 2
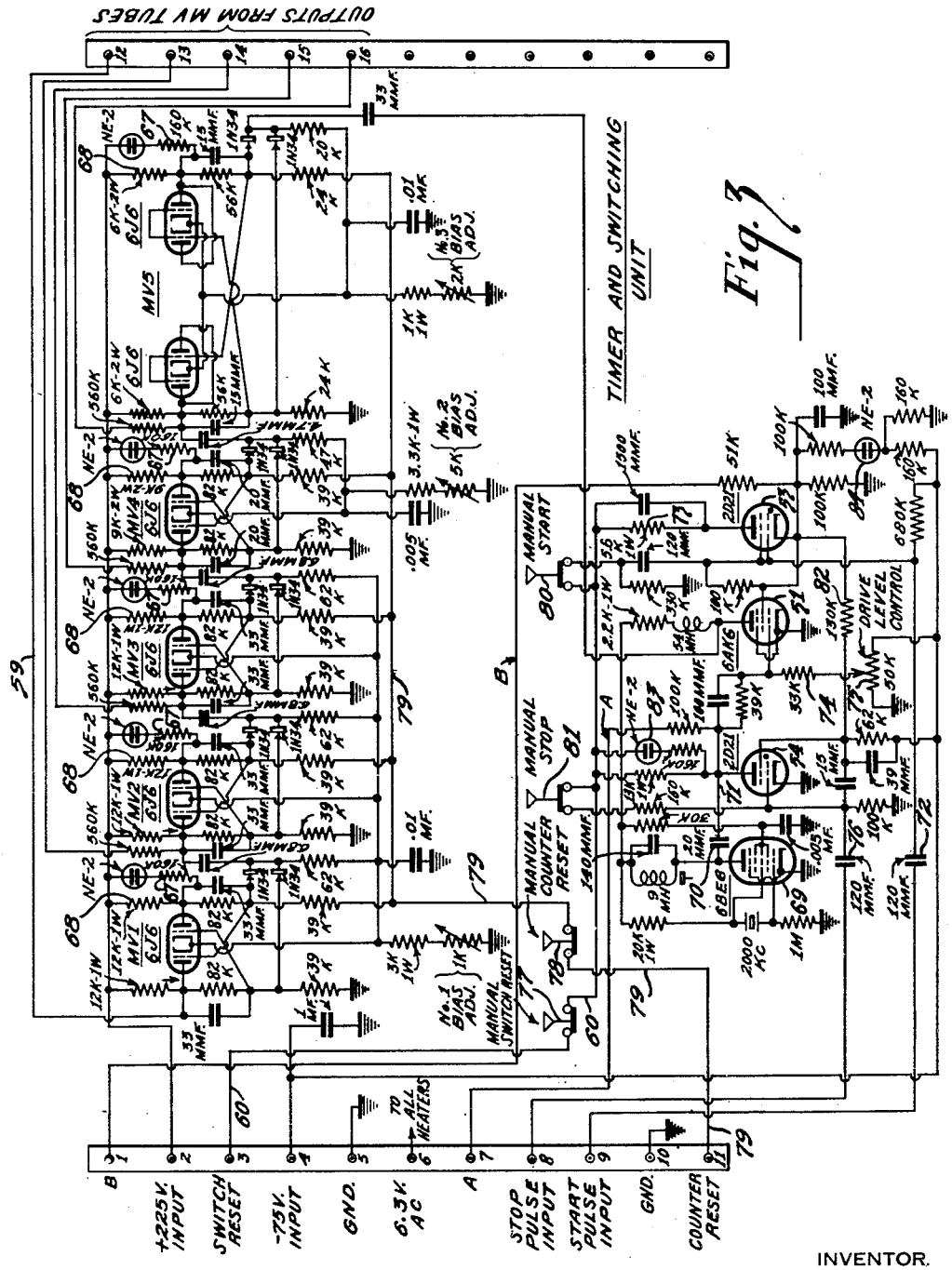
INVENTOR.
*Warren H. Bliss*
BY *C. D. Cuska*
ATTORNEY Aug. 28, 1951         W. H. BLISS         2,566,078
TIME MEASURING AND RECORDING DEVICE
Filed March 27, 1947                    4 Sheets-Sheet 3

INVENTOR.
Warren H. Bliss
ATTORNEY

Aug. 28, 1951 W. H. BLISS 2,566,078
TIME MEASURING AND RECORDING DEVICE
Filed March 27, 1947 4 Sheets-Sheet 4
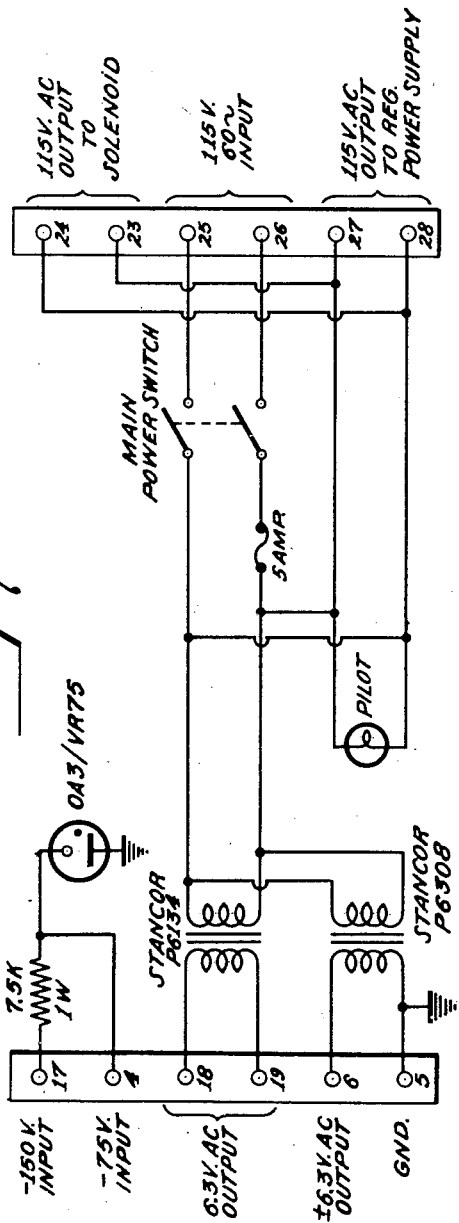
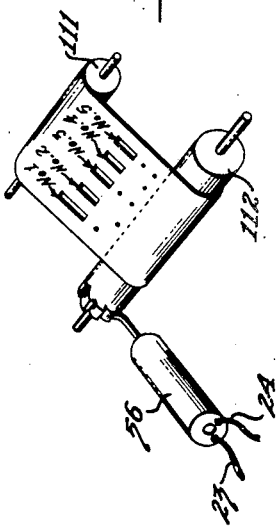
INVENTOR.
Warren H. Bliss
BY
C. D. Ruska
ATTORNEY Patented Aug. 28, 1951

2,566,078

UNITED STATES PATENT OFFICE 2,566,078

TIME-MEASURING AND RECORDING DEVICE

Warren H. Bliss, Princeton, N. J., assignor to Radio Corporation of America, a corporation of Delaware Application March 27, 1947, Serial No. 737,601

9 Claims. (Cl. 346—33)

This invention relates to time measuring and recording devices such as are adapted to measure very short time intervals of the order of 1 to 16 microseconds and to produce a permanent visible record of such measurements.

The time measuring device of the present invention consists of four units. It includes (1) a timing and switching unit, (2) a recorder and control unit, (3) a power input unit, and (4) a regulated power supply unit. In one practical embodiment of the invention, these four units are mounted one above the other in a small cabinet which is 37 inches high by 22 inches wide by 16 inches deep. The only external connections to this device are a pair of power input leads, a ground connection, a start pulse input lead and a stop pulse input lead. All the connections between the various units are made within the cabinet.

The timing and switching unit may be mounted at the top of the device. It includes five binary stages connected in tandem with the highest speed stage at the right. Each binary stage is a conventional locking type of trigger circuit having two stable states, or modes. For the zero or standby setting of the counter, current conduction is in the left hand triode of each stage. Across the right hand anode resistor of each stage is connected an indicator lamp so that the "on" condition of the counter is always indicated. The stages are coupled in tandem through crystal diodes which enables the counter to operate with high anode voltage swing and good stability.

The switching part of the timing and switching unit includes an oscillator from which input pulses are applied to the high speed stage of the counter through a shaper or driver tube under the control of a start tube and a stop tube. These start and stop tubes are interlocked electrically so that the stop tube is unresponsive to a stop pulse which is not preceded by a start pulse. Also the circuits are so interconnected with the counter that a start pulse which is not followed by a stop pulse within the time measuring range of the counter results in resetting of the counter to its standby condition without resetting of the recorder or making any record of the condition of the counter. Otherwise the resetting of the counter and advancement of the strip on which the record is made are altogether automatic.

For purposes of testing and checking operation of the timing and switching unit, manually operated switch reset, counter reset, stop and start switches are provided.

The recorder control unit is automatically put into operation after each application of both a start and a stop pulse to the switching circuit mentioned above. It includes means for advancing the strip on which the time measurement is to be recorded, means for effecting the recording of the measurement and means for automatically resetting the various elements of the entire time measuring and recording device to their standby conditions. Means are also included for resetting the counter in case no stop pulse is applied before the counter reaches the limit of its counting capacity.

The power input unit is mounted below the recorder control unit and the regulated power supply unit is mounted below the power input unit. While the described arrangement of the various units with respect to one another has proved satisfactory, the advantages of the invention are not restricted to such arrangement.

The invention has for its principal object the provision of an improved device and method of operation whereby a record of time intervals extending over a few microseconds may be made in response to start and stop pulses applied at the beginning and end of such interval. Important objects of the invention are the provision of means for automatically resetting the various elements of the device to a standby condition when a start and stop pulse have been applied to its input terminals; the provision of means for resetting the counter circuits but not the recorder control circuits when the count exceeds the capacity of the counter; the provision of means for rendering the stop circuit ineffective until after a start pulse has been applied; the provision of means for rendering the device insensitive to stray stop pulses; and the provision of manual control switches for testing and checking the operation of the device.

The invention will be better understood from the following description considered in connection with the accompanying drawings and its scope is indicated by the appended claims.

Referring to the drawings:

Figure 3 is a wiring diagram of the timer and switching unit,

Figure 4 is a wiring diagram of the recorder control unit,

Figure 5 is a wiring diagram of the power input unit, and

Figure 6 illustrates certain features of the recorder.

Figure 1:
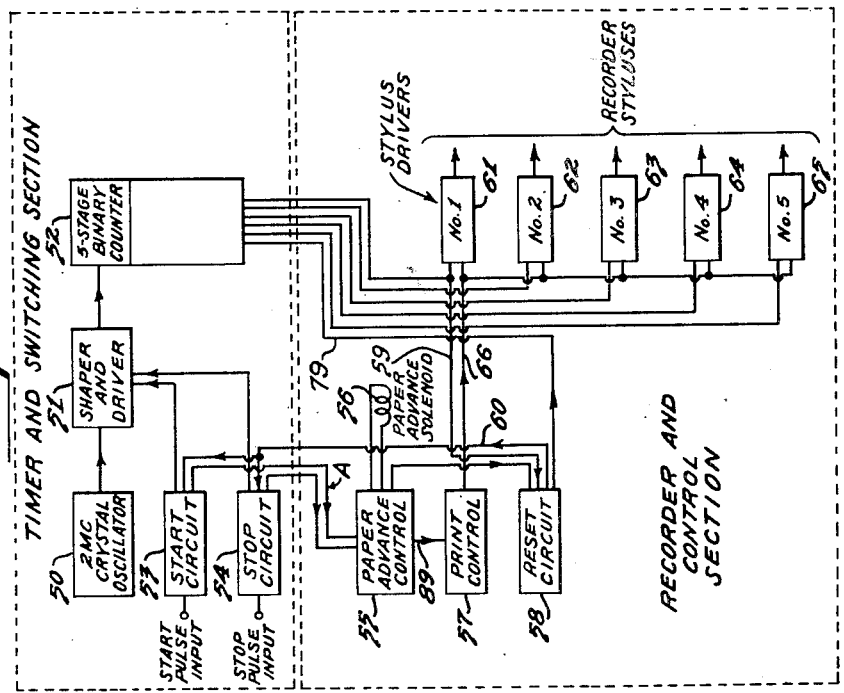
Figure 1 is a block diagram illustrating the relation between the various elements of the timer and switching unit and the recorder and control unit.

At the right and left hand sides of Figures 2 to 5 are to be found terminals which are so numbered as to identify the same terminal in each of the figures. Also near many of these terminals are placed legends which indicate their particular functions. These terminals with their reference numerals and legends are brought together in Figure 2 so as to give an easier view of the relation between the various units.

The block diagram of Figure 1 shows an oscillator 50 which is stabilized to deliver pulses at a substantially constant frequency so as to afford an accurate measure of time. Such pulses are delivered through a shaper and driver 51 to a 5-stage binary counter 52. The number of pulses so delivered is determined by the interval between start and stop pulses applied to the shaper and driver 51 through a start circuit 53 and stop circuit 54. Since the frequency of the oscillator 50 is known and substantially constant, the time interval between the start and stop pulses is readily computed from the number of pulses counted by the counter 52.

Connected to the start and stop circuits 53 and 54 is a paper advance control circuit 55 which is put into operation when start and stop pulses have been applied to the circuits 53 and 54. The details of this paper advance control circuit are shown in the upper left hand section of Figure 4. It functions (1) to energize a paper advance solenoid 56, (2) to activate a print control device 57 shown in the lower left hand section of Figure 4, and (3) to operate a reset circuit 58 shown in the upper right hand section of Figure 4.

Through a connection 59 between the low speed end of the counter 52 and the reset circuit 58, the counter 52 is automatically reset to its standby condition when the counting pulses exceeds the capacity of the counter thus ensuring clearing of the counter before additional counting pulses are applied to it. Potential for resetting the various parts of the time measuring and recording device to their standby conditions are applied from the reset circuit 58 through a lead 60.

Potential for energizing the stylus drivers 61 to 65, shown in the lower right hand section of Figure 4, is applied from the print control device 57 through a lead 66.

In normal operation of the time measuring and recording device, the measurement is quickly recorded on a strip of paper after each count and the device is automatically reset to be ready for the next measurement. The record consists of a series of dots made on a 2.25 inch strip of teledeltos facsimile recording paper. These dots have the same significance and have the same values as the indicator lamps of the counter. The paper is advanced about one-eighth of an inch for each measurement. Thus the record strip shows a series of dots for each measurement and these series are spaced about one-eighth of an inch apart longitudinally of the record strip.

After each start-stop sequence of the start and stop switching circuits, the paper advance control circuit is triggered. This energizes the paper advance solenoid which moves the paper ahead one step. While the paper is in motion, the print control circuit applies a trip pulse to the stylus driver tubes. Depending on the count to be recorded, a selected number of these stylus drive tubes discharge capacitors into their respective stylus circuits. This results from the fact that, at the end of each count, the appropriate driver tube biases are raised according to the status of the various binary counter stages so that the trip pulse triggers only the selected stylus drivers.

As the paper advance solenoid is released, the reset circuit is energized, as previously indicated, to trip the various parts of the device to their standby conditions.

Figure 2:
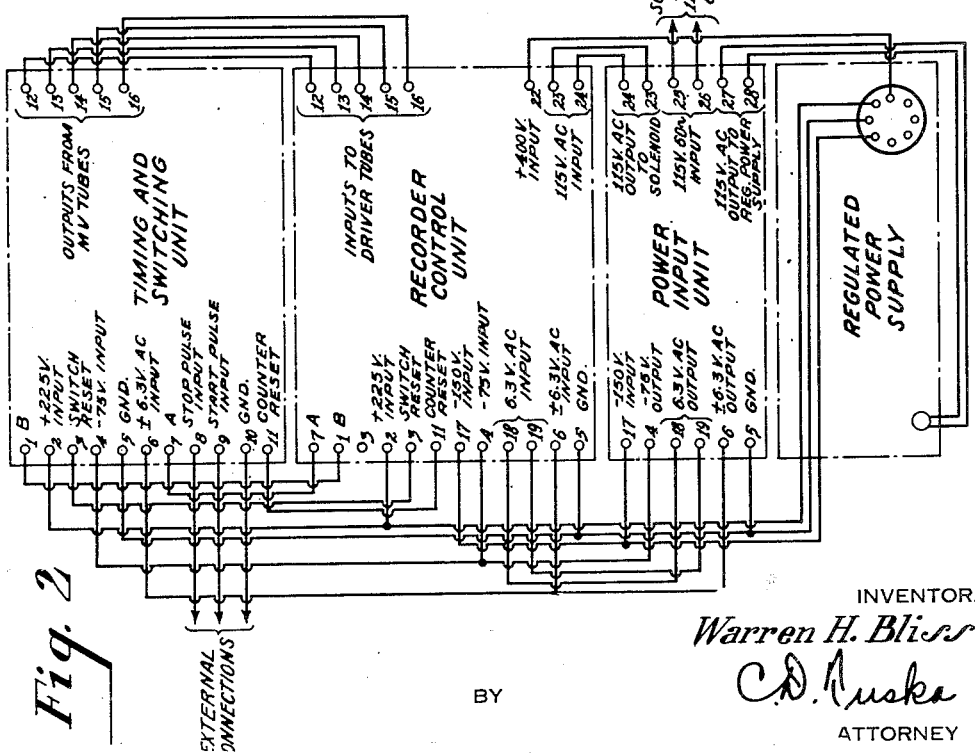
Figure 2 illustrates the relation between the various units of the device and indicates how these units are interconnected with one another.

Figure 3 shows the wiring connections of the timer and switching unit which is mounted at the top of the device as indicated by Figure 2. It includes five binary counters MV1 to MV5. These counter stages are connected in tandem with the highest speed stage MV5 at the right. Each binary stage is a conventional locking type of trigger circuit having two stable states or modes. For zero or standby setting of the counter, current conduction is in the left-hand triode of each stage. The NE—2 indicator lamps are connected in series with resistors 67 across the right-hand anode resistors 68 of the various stages so that a binary 1 condition of each stage is always indicated. Type 1N34 crystal diodes are connected between the stages and ahead of the high speed stage MV5 for coupling the stages and feeding the counting pulses to the first stage. This permits the trigger circuits MV1 to MV5 to be operated with high anode voltage swing and good stability.

The switching unit of Figure 3 includes a 2-megacycle crystal driven oscillator 69. The output of this oscillator is passed through a coupling capacitor 70 and a lead 71 to the control grid of the shaper and driver tube 51 which is controlled by the start tetrode 53 and the stop tetrode 54. In the reset or standby condition, the start tube 53 allows the screen grid voltage of the tube 51 to remain at a low negative potential. Under this condittion, no counting pulses are passed by the tube 51 to the input circuit of the counter stage MV5. When a start pulse is applied from the terminal 9 through the capacitor 72 to the grids of the start tube 53, this tube begins to conduct current through a resistor 73. As a result the screen grid potential of the tube 51 is made substantially positive, the tube 51 conducts current and counting pulses of negative polarity are passed to the stage MV5 of the counter. The control grid bias of the tube 51 is determined by the voltage drop of the resistors 74—75 and is of such value that the tube 51 conducts only during the positive peaks of the applied 2-megacycle wave.

When a stop pulse is applied from the terminal 8 through a capacitor 76 to the control grid of the stop tube 54, this tube starts conducting and, through the lead 71 which is connected to its anode, produces a partial short circuit across the output of the oscillator 69 and reduces the control grid bias of the tube 51 to a lower value. This action quickly stops the flow of output pulses from the tube 51 to the counter stage MV5 and terminates the operation of the counter.

An electrical interconnection or interlock makes the stop tube 54 non-responsive to a stop pulse until after the start tube 53 has been made conductive in response to a start pulse. This interlock is effected by connecting the screen grid of the stop tube 54 through a resistor 82 to the cathode of the start tube 53. With this connection, the screen grid of tube 54 is held at a high negative potential when the start tube 53 is not conducting and is at a more positive potential when the tube 53 is conductive. This interlock ensures that the stop tube 54 is not prematurely tripped by any stray pulses that may be applied thereto.

Lamp indicators 83 and 84 are connected respectively across the anode and cathode resistors of the tubes 54 and 53 for indicating the conductive state of these tubes. The functions performed by the other components of these circuits are obvious without explanation.

Before the next measurement can be made, the start and stop tubes 53 and 54 must be reset by terminating conduction through them and the binary counter stages MV1 to MV5 must be reset to zero with current conduction in their left-hand triodes. Both manual and automatic means are provided for performing this function. A momentary-open push button switch 77 opens the common anode supply lead 60 of the tubes 53 and 54 to reset them and a similar switch 78 in a common reset ground lead 79 serves to reset the various stages of the counter. For the purpose of manually starting and stopping the counting operation, momentary-close switches 81 and 80 are provided in the grid circuits of the start and stop tubes. How the counter and start and stop tubes are reset automatically is hereinafter explained in connection with Figure 4.

The recorder and control unit of Figure 4 is put into operation in response to a start-stop pulse sequence. This is accomplished through the control leads A and B by which the timer and switching unit is connected to the recorder control unit. Thus at the beginning of the counting cycle, the start tube 53 is conducting and the stop tube 54 is not conducting. Under these conditions, more positive potentials are applied through the leads A and B respectively to the grid and anode of the recorder control unit input tube 85 so that this tube draws current through a resistor 86 thereby making a control tube 87 non-conductive. The application of a stop pulse makes the stop tube 54 conductive thereby reducing the grid potential of the tube 85 to a point where it ceases to conduct. When this occurs, the diode 87 begins to conduct and a positive pulse is applied through a switch 88 to a trigger circuit V3.

The trigger V3 is of the well known type which is stable only with current conduction in its right-hand triode. The positive pulse applied to its left-hand grid through the switch 88 temporarily transfers current conduction to its left hand triode thereby energizing the paper advance control relay 90 and applying a positive pulse through a lead 89 to the left-hand grid of the print control trigger circuit V7 which is like the trigger circuit V3 in that it is of the slideback type and stable only with current conduction in its right hand triode.

When the control relay 90 is energized, it completes a circuit from the 115 v. A. C. input terminals 23—24 to the paper advance solenoid 56, which advances the paper preparatory to the recording of the next measurement. The length of time during which the paper advance solenoid is energized is determined by the capacity of a capacitor 91 and the adjustment of a resistor 92.

With zero setting of the counter stages MV1 to MV5, a relatively high negative bias potential is applied to the control grids of the stylus driver tubes through terminals 12 to 16. When any one of these counter stages is in a binary 1 condition, the grid of the corresponding stylus driver tube is made less negative.

After a time interval determined by the capacity of a capacitor 96 and the adjustment of a resistor 97, current conduction is transferred back to the right-hand anode of the trigger circuit V7 thus applying a positive pulse to the control grids of the stylus driver tubes 94 and making conductive such of these tubes as are connected to a counter stage which is in a binary 1 condition. Such of these tubes 94 as are thus made conductive discharge their capacitors 95 through the corresponding stylus drivers and the measurement is recorded on the paper strip.

During the intervals between recordings the condensers 95 are charged up to a high positive potential from the 400 volt source supplied to terminal 22.

Thus the five stylus driver tubes 94 (gas tetrodes type 2D21) in the lower right hand part of the diagram are all normally biased to a high negative value. At the end of any counting interval the bias values on certain ones of these tubes are raised somewhat in preparation to being triggered by a pulse from flip-flop stage V—7. When flip-flop stage V—7 returns to the stable state (right hand triode conducting) a positive pulse is passed on to the grids of all five gas tetrodes. Only those which have been prepared by change in bias are triggered.

When any one of these gas tubes is triggered it discharges its 2 mf. condenser 95 into its stylus circuit to make a black dot on the teledeltos recording paper. The discharge of the condenser drops the plate voltage on the gas tube so low that conduction ceases at the end of the discharge. The condenser then slowly recharges through the 470K plate resistor and the bias condition prevents further tube conduction until the next normal triggering action takes place.

The reset circuit shown at the upper right-hand section of Figure 4 is put into operation by a negative pulse delivered through a capacitor 98 when current conduction automatically returns to the normally conducting right-hand side of the trigger circuit V3. This negative pulse is applied through a crystal diode 99 to the grid of a control tube V4, thereby temporarily reducing the voltage drop of a resistor 101 and applying a positive pulse through a capacitor 102 to the control grid of a gas tube 103. When the gas tube 103 is triggered, current is drawn through a resistor 104 through which operating potential is applied to the anodes of the start and stop tubes 53 and 54.

As a result, the anode potentials of the start and stop tubes are reduced to a point where they are made non-conductive or reset to their standby condition.

When conduction ceases in gas tube 103 due to extinction by rise in cathode potential as condenser 103′ charges, a positive pulse is applied through a capacitor 105 to the grid of a tube 106 which takes current. This increases the voltage drop of a resistor 107 from which a positive potential is applied through the lead 79 to the left-hand grids of the stages MV1 to MV5 for resetting the counter to its standby condition. V5 receives a position pulse from V4 and discharges a 0.01 mf. condenser connected from the plate of V5 to ground. In order to get a sufficiently negative reset potential on "switch reset" lead 60 the cathode of tube V5 had to be operated at a negative potential of approximately −150 volts. The combined actions of the 0.01 mf. condenser in the plate circuit and the 0.05 mf. condenser in the cathode circuit cause conduction to cease in tube V5 at the end of the discharge period.

After conduction in V5 ceases, the 0.01 mf. plate condenser recharges to a positive voltage and passes on a positive pulse (or rise in voltage) to tube V6 by way of the 1500 mmf. condenser. This triggers gas tube V6 which discharges a 0.1 mf. condenser through the 200 ohm cathode resistor to produce the positive polarity counter reset pulse on the lead 79.

This leaves the time measuring and recording device reset and ready for a subsequent measurement. It may also be put into this condition by a negative pulse applied from the left-hand anode of the low speed counter stage MV1 through the lead 59, a link 108, a capacitor 109 and a crystal diode 110. This feature has the advantage that the device is automatically reset if the counting capacity of the counter is exceeded before a stop pulse is applied. Opening of the link 108 permits continuous operation of the device until a stop pulse is applied.

The power input unit is conventional and readily understood without explanation. Its wiring connections are shown in Figure 5.

A bird's-eye view of the various units of the device is afforded by Figure 2 wherein corresponding terminals of the different units have the same reference numerals and wherein the functions of these terminals are, for the most part, indicated by explanatory legends.

The paper advance mechanism may be of any suitable type. It is illustrated in Figure 6 as consisting of a feed roll 111 and a take-up roll 112, the take-up roll being actuated by the solenoid 56 through a mechanical coupling shown as a pawl and ratchet.

What the invention provides is a time measuring and recording device which operates automatically in response to start and stop pulses to measure and record successive and very short intervals of time. Such start and stop pulses obviously may be applied manually or automatically at the beginning and end of some industrial or other operation adapted to produce such pulses.

I claim as my invention:

1. The combination of a driver element having first and second input circuits and having an output circuit from which oscillations are to be delivered, oscillation supply means connected to the first of said input circuits, a start element having an input circuit and having an output circuit connected to said second input circuit so that a more positive potential is applied to said second input circuit and oscillations are transmitted to the output circuit of said driver element when said start element is conducting current, means connected to the input of said start element for applying a control pulse by which said start element is made conductive, a stop element having an input circuit and having an output circuit connected in shunt to said oscillation supply means, means for applying a control pulse to the input circuit of said stop element so that the transmission of oscillations to the output circuit of said driver element is interrupted, and reset means including an element having an input circuit connected to the output circuit of said stop element and an output circuit connected to the output circit of said start element.

2. The combination of a driver element having first and second input circuits and having an output circuit from which oscillations are to be delivered, oscillation supply means connected to the first of said input circuits, a start element having an input circuit and having an output circuit connected to said second input circuit so that a more positive potential is applied to said second input circuit and oscillations are transmitted to the output circuit of said driver element when said start element is conducting current, means connected to the input of said start element for applying a control pulse by which said start element is made conductive, a stop element having an input circuit and having an output circuit connected in shunt to said oscillation supply means, means for applying a control pulse to the input circuit of said stop element so that the transmission of oscillations to the output circuit of said driver element is interrupted, and start and stop element reset means including a tube having an input circuit connected to said stop element and an output circuit connected to said start element so that said tube conducts current only when said start element is conducting current and said stop element is not conducting current.

3. The combination of a driver element having first and second input circuits and having an output circuit from which oscillations are to be delivered, oscillation supply means connected to the first of said input circuits, a start element having an input circuit and having an output circuit connected to said second input circuit so that a more positive potential is applied to said second input circuit and oscillations are transmitted to the output circuit of said driver element when said start element is conducting current, means connected to the input of said start element for applying a control pulse by which said start element is made conductive, a stop element having an input circuit and having an output circuit connected in shunt to said oscillation supply means, means for applying a control pulse to the input circuit of said stop element so that the transmission of oscillations to the output circuit of said driver element is interrupted, start and stop element reset means including a tube having an input circuit connected to said stop element and an output circuit connected to said start element so that said tube conducts current only when said start element is conducting current and said stop element is not conducting current and means connected between the output circuit of said tube and the output circuits of said start and stop elements for making said start and stop elements nonconductive in response to interruption of the output current of said tube.

4. The combination of a driver element having first and second input circuits and having an output circuit from which oscillations are to be delivered, oscillation supply means connected to the first of said input circuits, a start element having an input circuit and having an output circuit connected to said second input circuit so that a more positive potential is applied to said second input circuit and oscillations are transmitted to the output circuit of said driver element when said start element is conducting current, means connected to the input of said start element for applying a control pulse by which said start element is made conductive, a stop element having an input circuit and having an output circuit connected in shunt to said oscillation supply means, means for applying a control pulse to the input circuit of said stop element so that the transmission of oscillations to the output circuit of said driver element is interrupted, start and stop element reset means including a tube having an input circuit connected to said stop element and an output circuit connected to said start element so that said tube conducts current only when said start element is conducting current and said stop element is not conducting current, means connected between the output circuit of said tube and the output circuits of said start and stop elements for making said start and stop elements nonconductive in response to interruption of the output current of said tube and manually operable means connected in the input circuits of said start and stop elements for selectively controlling the conductivity of said start and stop elements.

5. The combination of a driver element having first and second input circuits and having an output circuit from which oscillations are to be delivered, oscillation supply means connected to the first of said input circuits, a start element having an input circuit and having an output circuit connected to said second input circuit so that a more positive potential is applied to said second input circuit and oscillations are transmitted to the output circuit of said driver element when said start element is conducting current, means connected to the input of said start element for applying a control pulse by which said start element is made conductive, a stop element having an input circuit and having an output circuit connected in shunt to said oscillation supply means, means for applying a control pulse to the input circuit of said stop element so that the transmission of oscillations to the output circuit of said driver element is interrupted, start and stop element reset means including a tube having an input circuit connected to said stop element and an output circuit connected to said start element so that said tube conducts current only when said start element is conducting current and said stop element is not conducting current, means connected between the output circuit of said tube and the output circuits of said start and stop elements for making said start and stop elements nonconductive in response to interruption of the output current of said tube and means connected to said start and stop elements for manually resetting said start and stop elements.

6. The combination of a counter including a plurality of stages which are connected in cascade and are each operable to either first or second current conductive conditions in response to the application of oscillations to the first of said stages, a driver element having first and second input circuits and having an output circuit connected to the input of said first stage, oscillation supply means connected to said first input circuit of said driver element, a start element having an output circuit connected to said second input circuit of said driver element and having an input circuit to which a first control pulse may be applied for applying to said second input circuit of said driver element a potential by which oscillations are applied to said first stage of said counter, a stop element having an output circuit connected in shunt to said oscillation supply means and having an input circuit to which a second control pulse may be applied for interrupting the transmission of said oscillations to said first stage of said counter, a plurality of recorder circuits each having an input circuit coupled to a different one of said counter stages to be responsive to the conducting condition thereof and having an output circuit connected in parallel with a different capacitor, means for charging said capacitors, and means responsive to the application of said first and second control pulses to said start and stop elements for applying to the input circuits of said recorder circuits a potential whereby certain ones of said capacitors as determined by the conducting conditions of said counter stages are permitted to be discharged through said output circuits of said recorder circuits.

7. The combination of a counter including a plurality of stages which are connected in cascade and are each operable to either first or second current conductive conditions in response to the application of oscillations to the first of said stages, a driver element having first and second input circuits and having an output circuit connected to the input of said first stage, oscillation supply means connected to said first input circuit of said driver element, a start element having an output circuit connected to said second input circuit of said driver element and having an input circuit to which a first control pulse may be applied for applying to said second input circuit of said driver element a potential by which oscillations are applied to said first stage of said counter, a stop element having an output circuit connected in shunt to said oscillation supply means and having an input circuit to which a second control pulse may be applied for interrupting the transmission of said oscillations to said first stage of said counter, a plurality of recorder circuits each having an input circuit coupled to a different one of said counter stages to be responsive to the conducting condition thereof and having an output circuit connected in parallel with a different capacitor, means for charging said capacitors, means responsive to the application of said first and second control pulses to said start and stop elements for applying to the input circuits of said recorder circuits a potential whereby certain ones of said capacitors as determined by the conducting conditions of said counter stages are permitted to be discharged through the output circuits of said recorder circuits, and means responsive to the discharge of said capacitors coupled to said recorder element output circuits for recording the conductive conditions of said stages of said counter.

8. The combination of a counter including a plurality of stages which are connected in cascade and are each operable to either first or second current conductive conditions in response to the application of oscillations to the first of said stages, a driver element having first and second input circuits and having an output circuit connected to the input of said first stage, oscillation supply means connected to said first input circuit of said driver element, a start element having an output circuit connected to said second input circuit of said driver element and having an input circuit to which a first control pulse may be applied for applying to said second input circuit of said driver element a potential by which oscillations are applied to said first stage of said counter, a stop element having an output circuit connected in shunt to said oscillation supply means and having an input circuit to which a second control pulse may be applied for interrupting the transmission of said oscillations to said first stage of said counter, a plurality of recorder circuits each having an input circuit coupled to a different one of said counter stages to be responsive to the conducting condition thereof and having an output circuit connected in parallel with a different capacitor, means for charging said capacitors, means responsive to the application of said first and second control pulses to said start and stop elements for applying to the input circuits of said recorder circuits a potential whereby certain ones of said capacitors as determined by the conducting conditions of said counter circuits are permitted to be discharged through said output circuits of said recorder circuits, means responsive to the discharge of said capacitors coupled to said recorder circuits output circuits for recording the conductive conditions of said stages of said counter and record support means operable in response to the application of said first and second control pulses to said start and stop elements for moving a record between the recordings of said conductive conditions.

9. The combination of a counter including a plurality of stages which are connected in cascade and are each operable to either first or second current conductive conditions in response to the application of oscillations to the first of said stages, a driver element having first and second input circuits and having an output circuit connected to the input of said first stage, oscillation supply means connected to said first input circuit of said driver element, a start element having an output circuit connected to said second input circuit of said driver element and having an input circuit to which a first control pulse may be applied for applying to said second input circuit of said driver element a potential by which oscillations are applied to said first stage of said counter, a stop element having an output circuit connected in shunt to said oscillation supply means and having an input circuit to which a second control pulse may be applied for interrupting the transmission of said oscillations to said first stage of said counter, a plurality of recorder circuits each having an input circuit coupled to a different one of said counter stages to be responsive to the conducting condition thereof and having an output circuit connected in parallel with a different capacitor, means for charging said capacitors, means responsive to the application of said first and second control pulses to said start and stop elements for applying to the input circuits of said recorder circuits a potential whereby certain ones of said capacitors as determined by the conducting condition of said counter circuits are permitted to be discharged through said output circuits of said recorder circuits, means responsive to the discharge of said capacitors coupled to said recorder circuits output circuits for recording the conductive conditions of said stages of said counter and means responsive to the application of said first and second control pulses to said start and stop elements for resetting said counter and said start and stop elements.

WARREN H. BLISS.

REFERENCES CITED

The following references are of record in the file of this patent:

UNITED STATES PATENTS

| Number | Name | Date |
|---|---|---|
| 2,332,300 | Cook | Oct. 19, 1943 |
| 2,349,810 | Cook | May 30, 1944 |
| 2,403,873 | Mumma | July 9, 1946 |
| 2,415,870 | Ryder | Feb. 18, 1947 |
| 2,422,698 | Miller | June 24, 1947 |
| 2,428,990 | Rajchman | Oct. 14, 1947 |